June 26, 1951 O. L. MacSORLEY 2,558,447

HIGH-SPEED FREQUENCY DIVIDER

Filed Dec. 30, 1948 5 Sheets-Sheet 1

INVENTOR
Olin L. MacSorley
BY Morris A. Rabkin
ATTORNEY

June 26, 1951 O. L. MacSORLEY 2,558,447

HIGH-SPEED FREQUENCY DIVIDER

Filed Dec. 30, 1948 5 Sheets-Sheet 2

Inventor
Olin L. MacSorley
BY Morris Rabkin
Attorney

June 26, 1951 O. L. MacSORLEY 2,558,447

HIGH-SPEED FREQUENCY DIVIDER

Filed Dec. 30, 1948 5 Sheets-Sheet 3

Inventor
Olin L. MacSorley
BY
Attorney

June 26, 1951 | O. L. MacSORLEY | 2,558,447

HIGH-SPEED FREQUENCY DIVIDER

Filed Dec. 30, 1948 | 5 Sheets-Sheet 4

Inventor

Olin L. MacSorley

BY Morris Rabkin

Attorney

Inventor
Olin L. MacSorley
BY Morris A. Rabkin
Attorney

Patented June 26, 1951

2,558,447

UNITED STATES PATENT OFFICE 2,558,447

HIGH-SPEED FREQUENCY DIVIDER

Olin L. MacSorley, Collingswood, N. J., assignor to Radio Corporation of America, a corporation of Delaware Application December 30, 1948, Serial No. 68,264

6 Claims. (Cl. 250—27)

Figure 1:
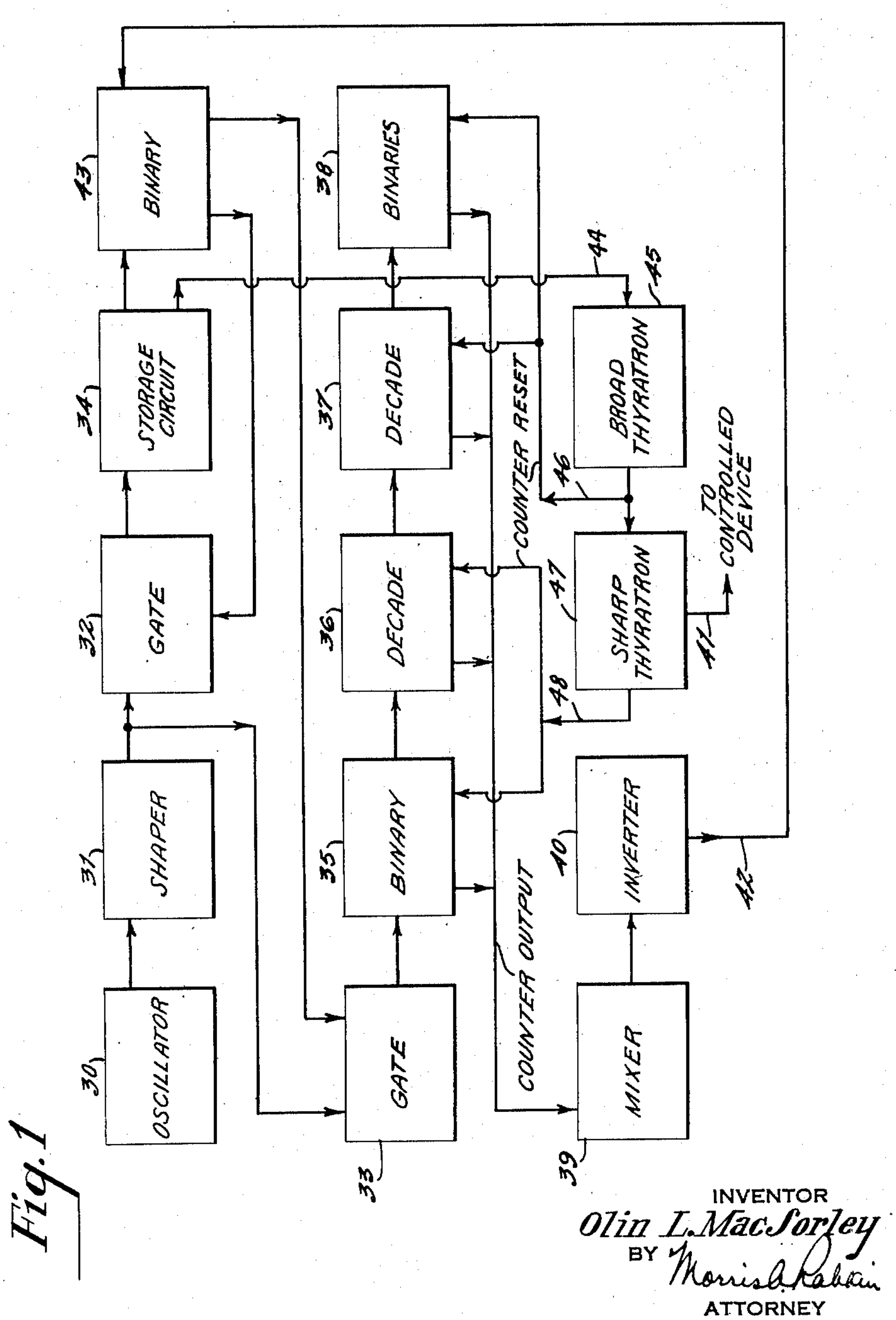

This invention relates to frequency dividers which are controllable to provide one output pulse in response to any desired number of input pulses. It has for its principal object the provision of an improved, adjustable division ratio frequency divider which is susceptible of reliable operation at very high frequencies.

One distinguishing feature of this improved frequency divider is the provision of means whereby each of its operating cycles is separated by a predetermined number of pulses so that the various circuits are always reliably set to their starting conditions before the beginning of each operating cycle. To this end, the output of a high frequency oscillator, after being suitably shaped, is applied to two gates. One of the gates functions to control the supply of high frequency pulses to the input of the frequency divider. The other of the gates controls the supply of pulses to a storage circuit which is like an electronic counter in that it includes a plurality of trigger circuits which are connected in cascade and operate to deliver one output pulse in response to a predetermined number of input pulses.

A binary or single trigger circuit which is operable to either of two stable conditions is connected to control the gates through which pulses are supplied either to the input of the frequency divider or to the input of the storage circuit. The current-conductive conditions of the single trigger circuit are established by the output pulses of the frequency divider and the storage circuit. Thus, when the frequency divider delivers an output pulse, the single trigger circuit is operated to such a condition that supply of pulses to the frequency divider is stopped and that to the storage circuit is started. Similarly, when the storage circuit delivers an output pulse, the condition of the single trigger circuit is changed so that the supply of pulses to the storage circuit is stopped and that to the frequency divider is started. Thus, between each operating cycle of the frequency divider, there is interposed a time interval dependent on the number of trigger circuits of the storage circuit.

Another distinguishing feature of the improved frequency divider is the utilization of a pulse derived from the storage circuit for the purpose of resetting the frequency divider to its start condition. Such pulse, which is obtained during the storage interval, functions through a broad pulse thyratron to reset the low frequency stages of the frequency divider and through this broad pulse thyratron and a sharp pulse thyratron to reset the high frequency stages of the frequency divider.

As will appear, the output of the broad pulse thyratron is also used to bias off certain coupling amplifiers of the divider during the resetting operation.

The invention will be better understood from the following description considered in connection with the accompanying drawings and its scope is indicated by the appended claims.

Referring to the drawings:

Fig. 1 is a diagrammatic showing wherein blocks are used to represent the various parts of the invention and the connection between these parts are indicated by single lines, and Figs. 2, 2A, 2B and 2C, placed end to end, show the complete connections of the improved frequency divider.

Fig. 1 shows an oscillator 30 which supplies its output to a shaper 31. In the shaper 31 the sine waves of the oscillator are changed to pulses suitable for operating the trigger circuits hereinafter described. The output pulses of the shaper 31 are delivered to gates 32 and 33. The gate 32 controls the delivery of pulses to a storage circuit 34. The gate 33 controls the delivery of pulses to a single trigger circuit or binary 35 which forms the first stage of the frequency divider. The frequency divider also includes decades 36 and 37 and binaries 38 and possibly additional binary or decade stages. As will appear, each stage of the frequency divider has a count selector switch and by means of these selector switches the frequency divider may be connected to deliver an output pulse in response to any selected number of input pulses applied to it through the gate 33. This type of frequency divider is referred to herein as an adjustable division ratio frequency divider.

The output pulses from the different stages of the frequency divider are delivered to a mixer 39 which passes a pulse only in response to the selected number of pulses applied to the input of the divider stage 35. The pulse passed by the mixer 39 is transmitted through an inverter 40 to a lead 42 to a single trigger circuit or binary 43 which has two stable operating conditions.

The pulse passed from the mixer 39 through the lead 42 to the binary 43 functions to put this binary in a condition such that the gate 33 stops the supply of pulses to the frequency divider and the gate 32 starts the supply of pulses to the storage circuit 34. After a number of pulses predetermined by the number of trigger circuits in the storage circuit 34, this storage circuit delivers a pulse to the binary 43 which is operated to the other of its stable conditions so that the gates 32 and 33 are made to exclude pulses from the storage circuit and to pass pulses to the frequency divider.

Also derived from the storage circuit 34 through a lead 44 is a pulse, obtained during the storage interval, which functions (1) through a broad pulse thyratron 45 and a lead 46 to reset the decade 37 and the binary 38 and (2) through the thyratron 45, a sharp wave thyratron 47 and a lead 48 to reset the binary 35 and the decade 36. The resetting operation occurs sufficiently prior to the time the storage circuit has concluded its count and the decade 37 and binary 38 have consequently commenced their count, that the decade and binary have ample time to settle down and not interfere with or provide an erroneous count. Similarly, since the storage circuit completes its count in every instance, there are no resetting difficulties to affect that circuit.

As explained in connection with Figs. 2, 2A, 2B and 2C, the output pulse of the thyratron 45 is also utilized to bias off certain coupling amplifiers of the frequency divider during the resetting operation, the purpose of this being to isolate transients which could cause improper resetting of the frequency divider.

At this point it should be understood that the trigger circuits of the frequency divider, the storage circuit and the binary 43 may be of the type wherein a pair of triodes have their anodes each cross connected to the grid of the other so that current conduction is stable in either one or the other of the triodes in response either (1) to the application of a negative pulse to the grid of a triode which is conducting or (2) to the application of a positive pulse to the grid of a triode which is not conducting. It will appear that some of the trigger circuits which operate at relatively low frequencies have energizing potential applied to their anodes through a resistor which is common to two individual anode resistors. In this type of trigger circuit, current conduction also may be changed from one triode to the other by the application of a negative pulse at the junction of the common and individual anode resistors.

Figure 2:
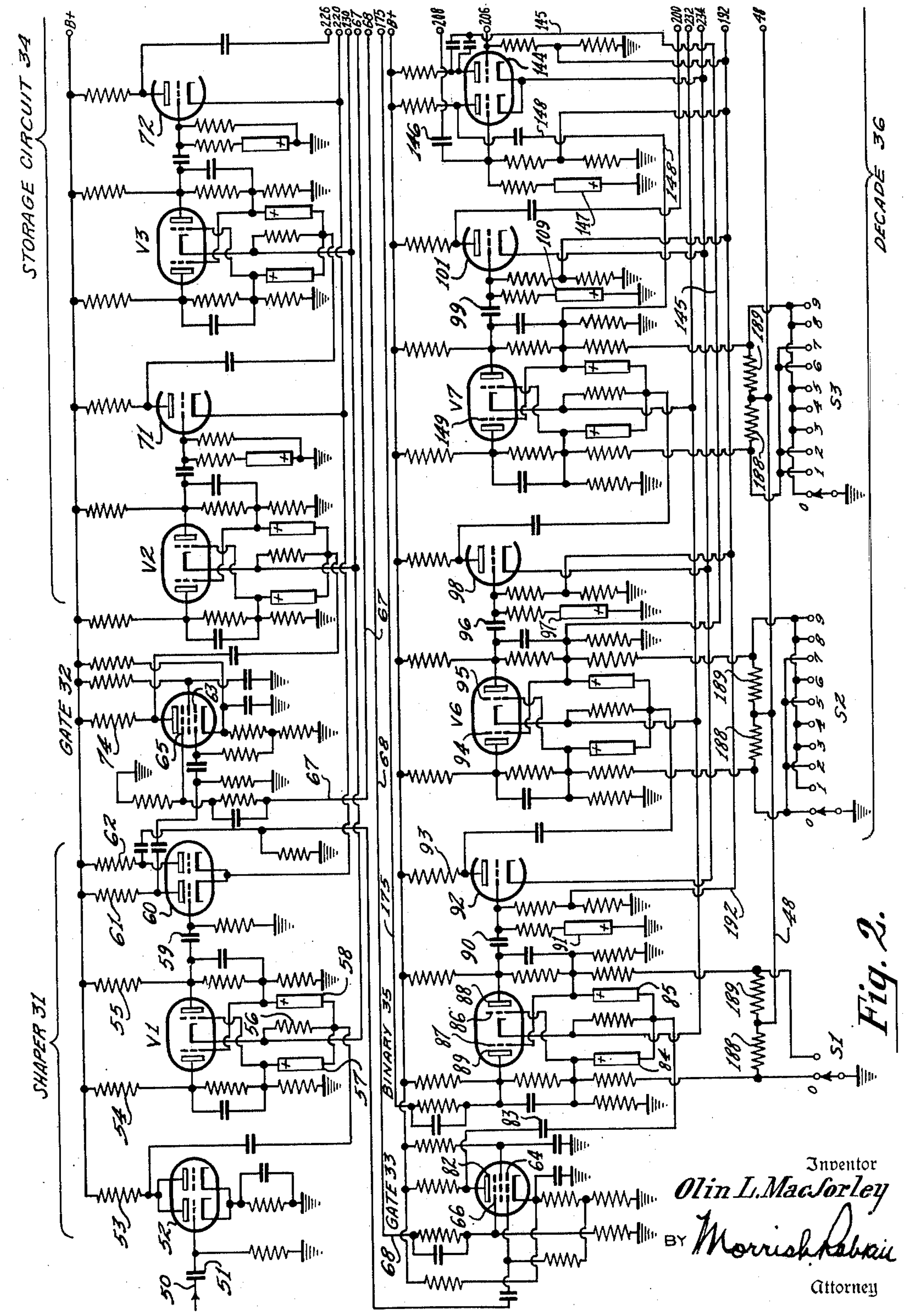

As is well known, a number of such trigger circuits may be connected in cascade so that the first changes its current conductive condition in response to every input pulse, the second changes its current conductive condition in response to every other input pulse, etc. It is also well known that four of these trigger circuits in addition to being connected in cascade, may be provided with feed back connections such that they deliver one output pulse in response to ten input pulses. The details of these various connections are shown in Figs. 2 and 2A.

In Figs. 2, 2A, 2B and 2C the different parts have applied to them the same reference numerals as in Fig. 1 and additional reference numerals, beginning with the numeral 50, are used to indicate the details of such parts. The drawings should be placed end to end and leads interconnecting the drawings have the same reference numeral on each drawing. Some of the reference numerals, 212 through 234, are not referred to but are shown in the drawings as lead identifying numerals to facilitate following the connections between drawings.

Figure 2A:
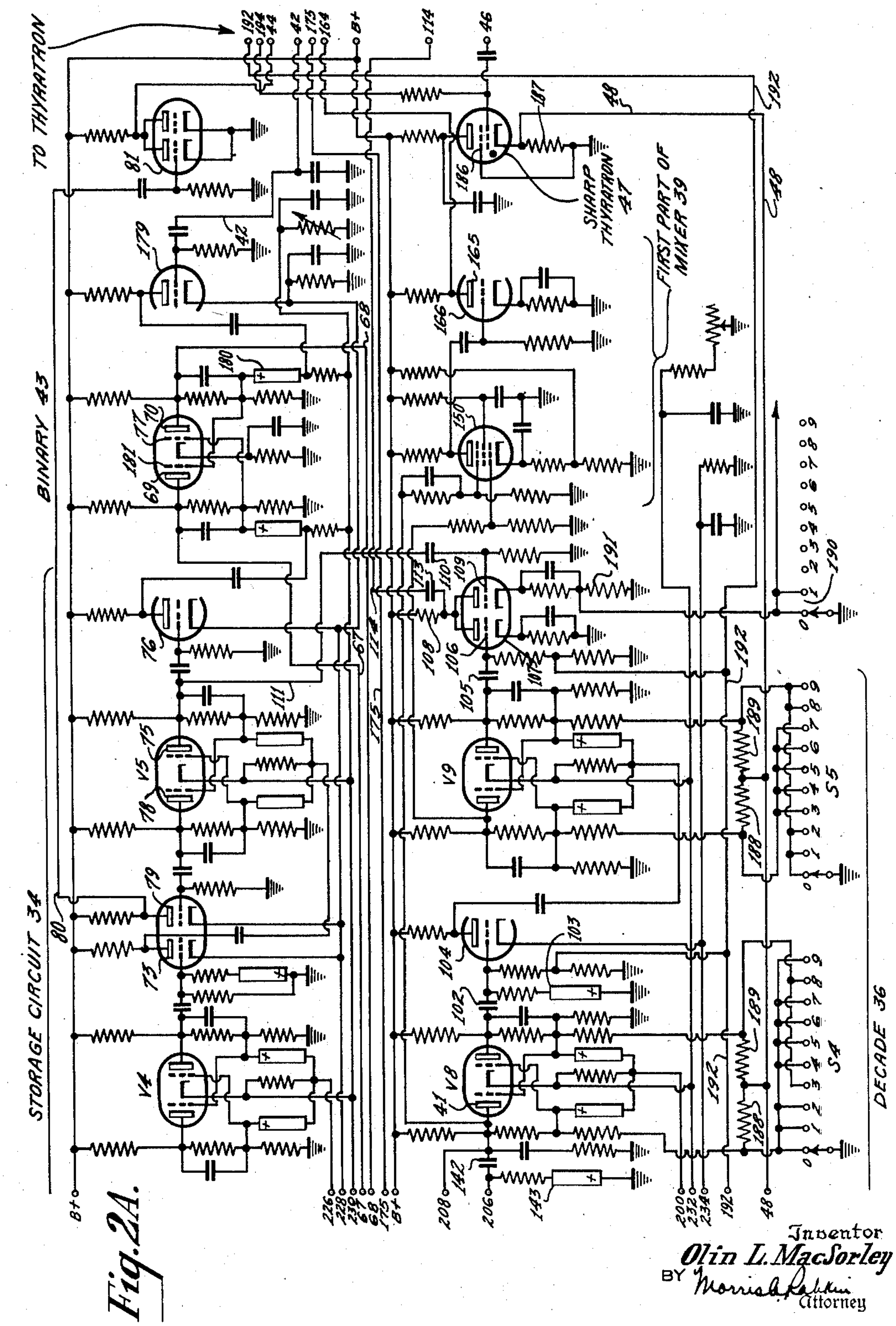
Figure 2B:
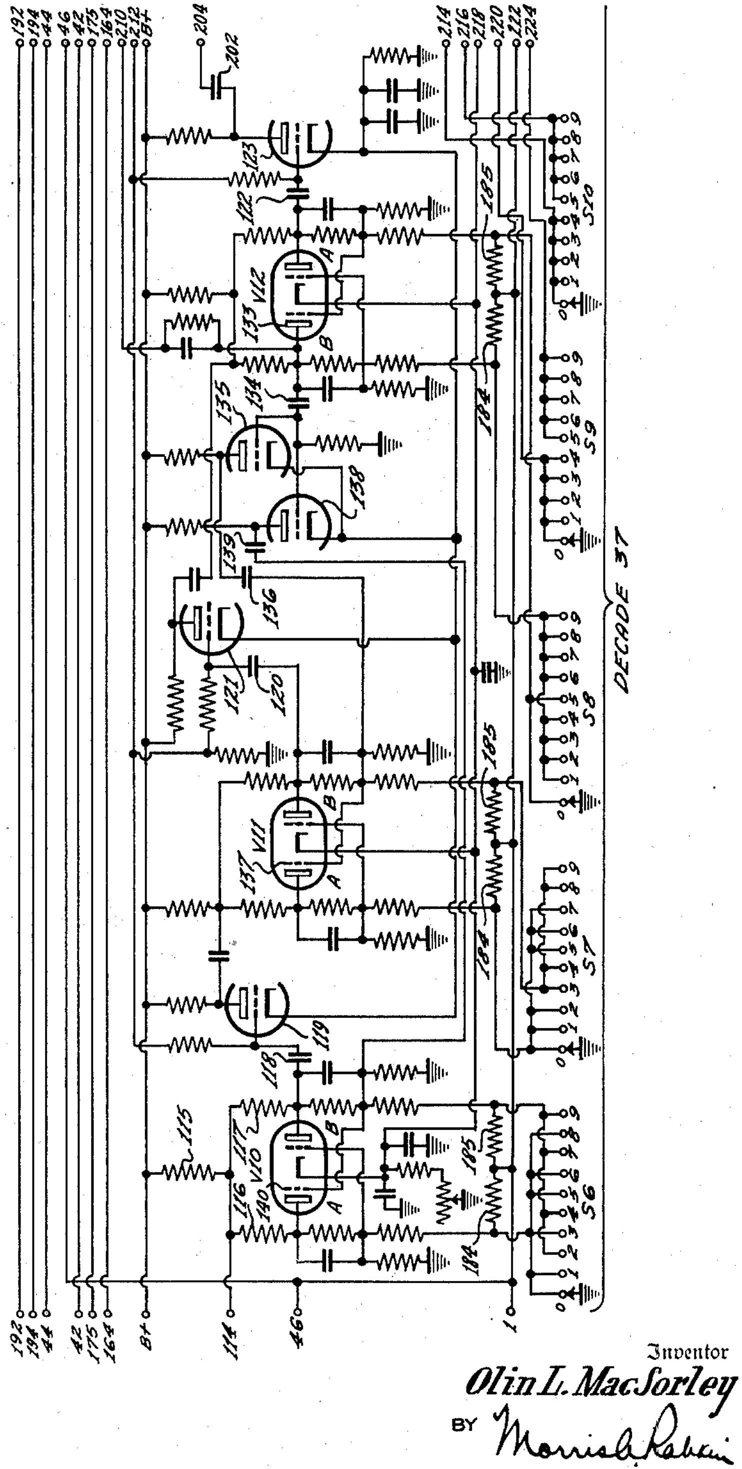
Figure 2C:
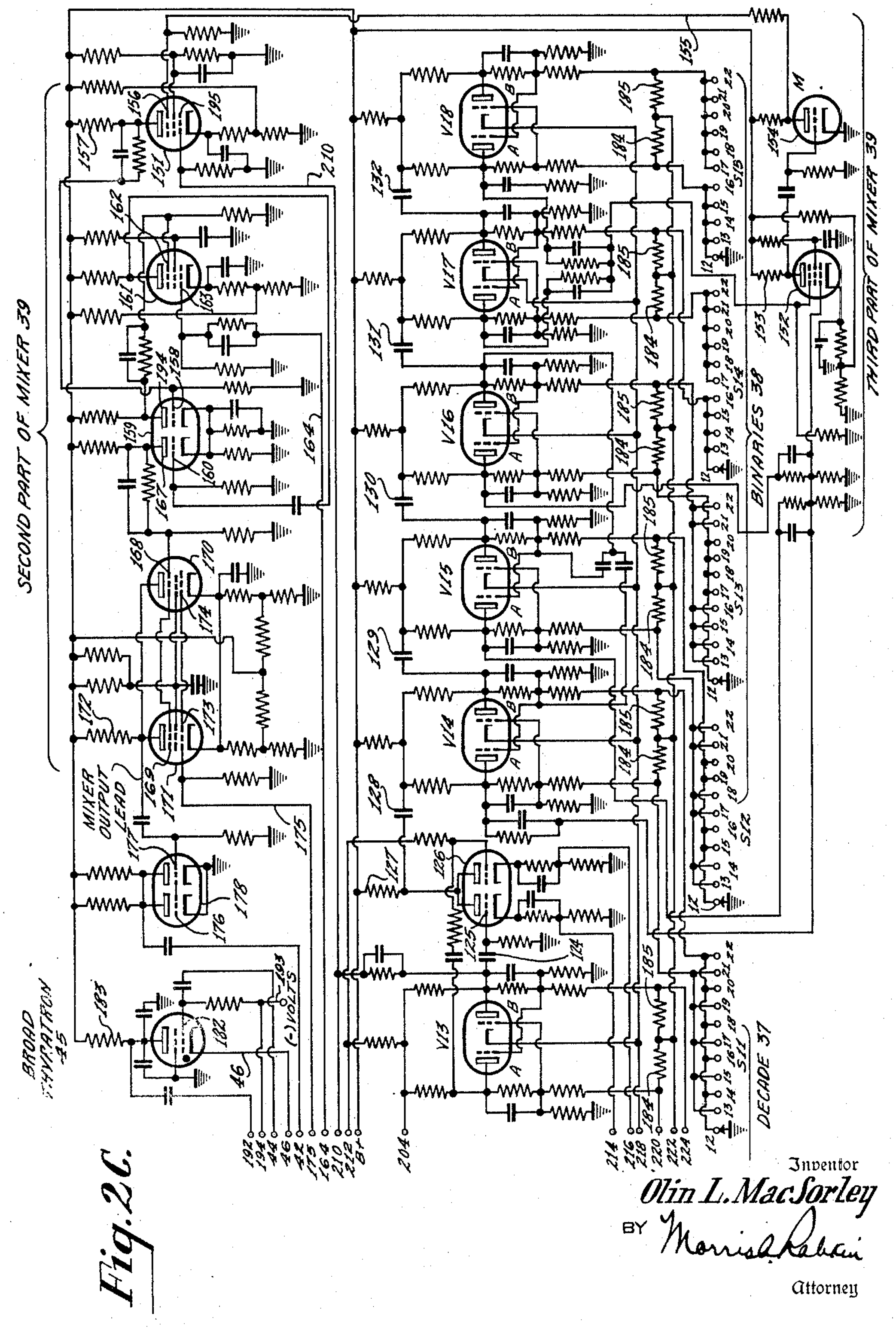

It will be found that the mixer 39 of Fig. 1 includes three parts one of which is located at the lower right hand corner of Fig. 2A, another of which is located at the upper right hand corner of Fig. 2C and the other of which is located at the lower right hand corner of Fig. 2C. As will appear, these parts of the mixer are so interconnected with each other and with the different stages of the frequency divider that they respond to the selected count by producing a pulse at the "Mixer Output Lead" (see Fig. 2C).

The output of the oscillator 30 of Fig. 1 is applied through a lead 50 and coupling capacitor 41 to the grids of a duotriode 52 which has a resistor 53 in its anode lead. The pulses produced at the lower terminal of the resistor 53 are applied to the grids of a trigger circuit V1.

The trigger circuit V1, like those of binary 35, decade 36 and storage circuit 34, is of well known type which has energizing potential applied to its anodes through separate resistors 54 and 55, has its anodes each cross-connected to the grid of the other through a resistor which is shunted by a capacitor, has bias potential applied to its grids through a resistor 56 and has operating pulses of negative polarity applied to its grids through crystal rectifiers 57 and 58. It is known that this type of trigger circuit is capable of operating at a very high speed.

Output pulses of substantially square wave form are applied through a capacitor 59 to the grids of a duo-triode 60 which has resistors 61 and 62 in its anode leads. Pulses produced at the lower terminal of the resistor 61 are applied to the grid 63 of the gate 32. Pulses produced at the lower terminal of the resistor 62 are applied to the grid 64 of the gate 33. The other control grids 65 and 66 of the gates 32 and 33 are connected respectively through leads 67 and 68 to the anodes 69 and 70 of the binary 43. With these connections, pulses are passed only through the gate 32 when current conduction is in the right hand triode of the binary 43 and only through the gate 33 when current conduction is in the left hand triode of the binary 43. Which triode is conducting at any given time depends on whether the last control pulse applied to the binary 43 has been received from the storage circuit 34 or the mixer 39.

The storage circuit is shown as including four trigger circuits V2, V3, V4 and V5. These trigger circuits are connected in cascade by means of amplifiers 71, 72 and 73. Input to the storage circuit 34 is derived from the lower terminal of the anode lead resistor 74 of the gate 32. Output from the storage circuit 34 is from the right hand anode 75 of the trigger circuit V5 through an amplifier 76 to the right hand grid 77 of the binary 43. Such output is effective to transfer current conduction from the right to the left triode of the binary 43 thereby stopping the transmission of pulses to the storage circuit and starting the transmission of pulses to the adjustable division ratio frequency divider as indicated above.

From the left hand anode 78 of the trigger circuit V5 is derived a pulse which is applied through an amplifier 79 and a lead 80 to the grids of a duotriode inverter 81 for operating the thyratrons for resetting the frequency divider as explained more fully below. The pulse, of the proper polarity required for operating the thyratrons, is obtained when the trigger circuit V5 is first turned over, which is when the storage circuit is half way through its operating cycle, or in the present instance at the count of eight. The pulse, of the proper polarity which is required to operate binary 43, is only obtained from the trigger circuit V5 when it is turned back or at the count of 16 when it is restored to its initial condition.

Input to the frequency divider is from the anode 82 of the gate 33 through connections including a capacitor 83 to the grids of the binary 35. The binary or trigger circuit, like the trigger circuits V1 to V5, has crystal rectifiers 84 and 85 connected in its anode leads so that only the negative pulses are applied to the grids 86 and 87. As a result, each negative pulse shifts current conduction from one to the other of the anodes 88 and 89.

The decade 36 includes trigger circuits V6 to V9. The output of binary 35 is applied to the input of the trigger circuit V6 through a coupling circuit which includes a capacitor 90, a crystal rectifier 91 and an amplifier 92 provided with a resistor 93 in its anode lead from the lower terminal of which negative pulses are applied to the grids 94 and 95. Similarly V6 is coupled to V7 through a capacitor 96, a crystal rectifier 97 and an amplifier 98, V7 is coupled to V8 through a capacitor 99, a crystal rectifier 100 and an amplifier 101 and a lead 200, and V8 is coupled to V9 through a capacitor 102, a crystal rectifier 103 and an amplifier 104. Output from the decade 36 is delivered through a capacitor 105 to the left hand grid 106 of a duotriode 107 which has a resistor 108 in the lead to its anodes. The other grid 109 of the duotriode 107 is coupled through a capacitor 110 and lead 11 to the anode 75 of V5. With these connections, the current drawn through the resistor 108 is either reduced or interrupted when current is drawn through the anode lead resistor 112 of the trigger V9 and the anode of the amplifier 75.

The pulses produced at the lower terminal of the resistor 108 are applied through a capacitor 113 and a lead 114 to the input of the decade 37 which includes the trigger circuits V10 to V13. These trigger circuits are of the type wherein (1) energizing potential is applied to the anodes through a common resistor 115 and separate resistors 116 and 117 and (2) the current conductive conditions of the two triodes are changed by the application of a negative pulse at the junction between the common and separate resistors.

The trigger circuit V10 is coupled to V11 through a capacitor 118 and an amplifier 119, V11 is coupled to V12 through a capacitor 120 and an amplifier 121 and V12 is coupled to V13 through a capacitor 122, an amplifier 123, a capacitor 202 and a lead 204.

The output of the decade 37 is applied through duotriode 126 to the first of binaries 38. Tube 126 acts as an electronic switch to select the output of V13 from plate A or B in accordance with the setting of switch S10.

Input to the group of five binaries 38 is from the lower terminal of the resistor 127 through a capacitor 128. The group of binaries 38 includes trigger circuits V14 to V18 which are connected in cascade through capacitors 129—132.

Each of the decades 36 and 37 are provided with feed-back connections from an anode of the third trigger circuit to a grid of the first and second trigger circuits so that they function in a known manner to deliver one output pulse to the input of a succeeding divider stage in response to ten input pulses.

Thus in the decade 37, for example, V12 has its anode 133 coupled through a capacitor 134, an amplifier 135, and a capacitor 136 to the grid 137 of V11. It also has its anode 133 coupled through the capacitor 134, an amplifier 138 and a capacitor 139 to the grid 140 of V10.

Similarly in the decade 36, the anode 41 of V8 is coupled (1) by means of a capacitor 142, a crystal rectifier 143, a lead 206, one triode of a duotriode 144 and a lead 145 to the grid 94 of V6 and (2) by means of lead 208, a capacitor 146, a crystal rectifier 147, the other triode of the duotriode 144 and a lead 148 to the grid 149 of V7.

The binary 35, the decades 36 and 37 and the binaries 38 are provided with selector switches S1 to S15 which are similar in most respects to the selector switches S1 to S10 of my copending application Ser. No. 16,835, filed March 24, 1948. The selector switches S1 to S15, like those of the copending application, each include a series of fixed contacts which are connected to one or the other anode of a different trigger circuit and are arranged to cooperate with a movable contact which is grounded. The fixed contacts of each decade are so arranged with respect to one another that the decade is always reset to the complement of the number of input pulses desired to produce the required control potential. In the use of the high frequency decade 36, the output to the mixer is derived from the last two stages of the decade and the most favorable combination of anode voltages is always applied to the grids of a mixer tube 150 which performs a part in producing the reset potential applied to the lead 48 from the sharp thyratron 47.

In the case of the decade 37, anode voltages from the stages V12, through lead 210, and V13 are combined and applied to the grid of a mixer tube 151.

In the case of the binaries 38, the voltages of the left hand anodes of the stages V14 to V18 inclusive are combined. These combined voltages control a mixer tube 152 so that, when minimum current is drawn through its anode lead resistor 153, a more negative potential is applied from the anode of a tube 154 through a lead 155 to the grid 156 of the mixer tube 151. Thus when the control potentials derived from the decades 37 and 38 and the binary V18 have their minimum values simultaneously, minimum current is drawn through the anode lead resistor 157 of the tube 151 and a more positive potential is applied to the grid 158 of a duotriode 159.

The other grid 160 of the duotriode 159 derives its potential from the anode of a tube 161 which has one of its grids 162 connected to the right hand anode of the duotriode 159 and has its other grid 163 connected through a lead 164 to the anode 165 of a triode 166 which is controlled by the output of the mixer tube 150 of the decade 36.

Output potential from the anode 167 of the duotriode 159 is applied to the grids 168 and 169 of mixer tubes 170 and 171 which draw current through a common anode lead resistor 172. Potential is applied to the grids 173 and 174 of the tubes 170 and 171 through a lead 175 from the anode 89 of the binary 35. Output from the entire mixer is applied to the grids 176 and 177 of a duotriode 178 which has its output connected by a lead 42 to the grid of a triode 179. Output potential is applied from the triode 179 through a crystal rectifier 180 to the grid 181 of the binary 43 which functions to control the gates 32 and 33 in the manner explained above.

Through the lead 44, potential is applied to the grid 182 of the broad pulse thyratron 45 from tube 81. As a result, the thyratron 45 draws current through an anode lead resistor 183 and through one or the other of the trigger circuit resistors 184 and 185 which are selectively connected in the cathode lead of the thyratron 45 by means of selector switches S6 to S15. As is well known, the potential thus produced in each resistor 184 and 185 is effective to reset the trigger circuits V10 to V18 to current conductive conditions determined by the number selected by the switches S6 to S15.

The potential developed at the cathode of the thyratron 45 also is applied through the lead 46 to the grid 186 of the sharp thyratron 47 which has a cathode lead resistor 187. From the upper terminal of the resistor 187, potential is applied to the resistor 188 or 189 of the trigger circuits 35 and V6 to V9 for resetting these trigger circuits in current conductive conditions selected by the switches S1 to S5.

A switch 190, not previously mentioned is arranged to short circuit a cathode lead resistor 191 of the duotriode 107. This is required in arranging the switching circuit to keep it direct reading and allow for the pulses that go into the storage circuit.

The potential developed at the anode of the thyratron 45 is applied through a lead 192 to the grids of coupling amplifiers 92, 98, 101, 144, 104 and 107 which are biased off during the resetting of the frequency divider.

Grid bias potential is applied to the thyratron 45 from a lead 193 and from the lead 193 through a lead 194 to the thyratron 47.

It is apparent that (1) the more negative anode potential of the thyratron 45 biases off the coupling amplifiers, (2) the more positive cathode potential of the thyratrons 45 and 47 function through the various selector switches to establish current conduction in one or the other triode of each stage of the frequency divider, and (3) the more positive anode potential of the duotriode 178 functions to establish current conduction in the triode 179 so that more current is drawn through its anode resistor and there is produced a potential such that current conduction is established in the anode 70 of the binary 43 and a more positive potential is applied from the anode 69 through the lead 67 to the grid 65 of the gate 32. As previously explained, the output of storage circuit functions to change the current conductive condition of the binary 43 after a time predetermining by the number of its trigger circuit stages.

Obviously, the most negative anode potential of the duotriode 178 is produced when the mixer tubes 170 and 171 are not conducting, the left side of duotriode 159 is conducting and the tube 161 is not conducting. The tube 161 has minimum conduction only when its grids 162 and 163 are made sufficiently negative by the selected control potential of the decade 36 and by the potential of the anode 194 of the duotriode 159. Maximum conduction of the anode 194 is realized when the tube 151 is not conducting as a result of the more negative potentials applied to its grids 195 and 156 respectively from decade 37 through lead 210 and through the lead 155 from the mixer tube 154 which is responsive to the selectors of the binaries as already explained. It thus follows that the binary 43 is enabled to put the gate 32 in condition to pass pulses to the storage circuit 34 only in response to the division ratio selected for the frequency divider by the selector switches S1 to S15.

It is to be understood that fewer stages may be provided in the storage circuit 34 in which case the switching circuits have to be revised to accommodate the new storage count. It is also possible to eliminate certain of the amplifiers and to revise the mixing circuits to include a smaller number of tubes and components. Such modifications have been incorporated in a later embodiment of the invention but do not alter the essential features of the invention as heretofore described and hereinafter claimed.

What is claimed is:

1. The combination of a plurality of tandem-connected frequency divider stages each including a pair of electron discharge devices which are connected to have energizing potential applied to their anodes through separate resistors and have their anodes each cross-connected to the grid of the other so that current conduction is stable either in one or the other of said anodes, time delay means having an input and an output, means coupled to said time delay means input and to said first frequency divider stage for supplying input pulses alternatively to the input of said time delay means or to the input of the first of said frequency divider stages, and means responsive to the outputs from said frequency divider stages and said time delay means for controlling said pulse supplying means to apply said input pulses alternatively to said time delay means for the delay interval of said time delay means and to said frequency divider for the interval of said frequency divider.

2. The combination of a plurality of tandem-connected frequency divider stages each including a pair of electron discharge devices which are connected to have energizing potential applied to their anodes through separate resistors and have their anodes each cross-connected to the grid of the other so that current conduction is stable either in one or the other of said anodes, a pulse storage circuit, means coupled to the input of said pulse storage circuit and to the input of the first stage of said frequency divider for supplying input pulses alternatively to said input of said pulse storage circuit or to said input of the first stage of said frequency divider, means coupled to the outputs of said frequency divider and said pulse storage circuit and to said pulse supplying means to control said pulse supplying means to apply input pulses to said frequency divider in response to an output pulse from said pulse storage circuit and to apply input pulses to said pulse storage circuit in response to an output pulse from said frequency divider, and means coupled between said pulse storage circuit and said frequency divider stages to reset said frequency divider stages to a predetermined starting condition responsive to the application of a predetermined number of said input pulses to said pulse storage circuit.

3. The combination of a plurality of tandem-connected frequency divider stages each including a pair of electron discharge devices which are connected to have energizing potential applied to their anodes through separate resistors and have their anodes each cross-connected to the grid of the other so that current conduction is stable either in one or the other of said anodes, time delay means, means coupled to the inputs of said time delay means and the first stage of said frequency divider for supplying input pulses alternatively to the input of said time delay means or to the input of the first stage of said frequency divider, means coupled between said frequency divider, said time delay means and said input pulse means to control said input pulse means to supply input pulses to said time delay means in response to output from said frequency divider and to supply input pulses to said frequency divider in response to output from said time delay means, and means coupled between said pulse storage circuit and said frequency divider to decrease the conductivity of the tandem connections between some of the stages of said frequency divider responsive to the application of a predetermined number of said input pulses to said time delay means.

4. The combination of a plurality of tandem-connected frequency divider stages each including a pair of electron discharge devices which are connected to have energizing potential applied to their anodes through separate resistors and have their anodes each cross-connected to the grid of the other so that current conduction is stable either in one or the other of said anodes, time delay means, means coupled to the inputs of said time delay means and the first stage of said frequency divider for supplying input pulses alternatively to the input of said time delay means or to the input of the first of said frequency divider stages, control means to control said input pulse means responsive to output from said frequency divider to supply input pulses to said time delay means during the delay interval of said time delay means and to control said input pulse means responsive to output from said time delay means to supply input pulses to said frequency divider first stage for a predetermined interval, said control means being coupled between said frequency divider, said time delay means and said input pulse means, and reset means coupled between said time delay means and said frequency divider to reset said frequency divider to a predetermined starting condition responsive to output from said time delay means derived during the interval within which said input pulse means is applying pulses to said time delay means.

5. The combination of a plurality of tandem-connected frequency divider stages each including a pair of electron discharge devices which are connected to have energizing potential applied to their anodes through separate resistors and have their anodes each cross-connected to the grid of the other so that current conduction is stable either in one or the other of said anodes, a pulse storage circuit, means coupled to the inputs of said pulse storage circuit and the first stage of said frequency divider for supplying input pulses alternatively to the input of said pulse storage circuit or to the input of the first of said frequency divider stages, and means to control said input pulse means responsive to output from said frequency divider to supply input pulses to said time delay means during the delay interval of said time delay means and to control said input pulse means responsive to output from said time delay means to supply input pulses to said frequency divider first stage for a predetermined interval, said control means being coupled between said frequency divider, said time delay means and said input pulse means.

6. The combination of a plurality of tandem-connected frequency divider stages each including a pair of electron discharge devices which are connected to have energizing potential applied to their anodes through separate resistors and have their anodes each cross-connected to the grid of the other so that current conduction is stable either in one or the other of said anodes, a pulse storage circuit having a first output to provide an output pulse during the storage interval and a second output to provide an output pulse at the end of the storage interval, means coupled to the inputs of said pulse storage circuit and the first frequency divider stage to apply input pulses alternatively to said inputs, control means coupled to said frequency divider output and to said pulse storage circuit second output to control said input pulse means to apply pulses to said frequency divider first stage for a predetermined interval responsive to output from said pulse storage circuit and to said pulse storage circuit for said storage interval responsive to output from said frequency divider stages, and reset means coupled between said pulse storage circuit first output and said frequency divider stages to reset said frequency divider to a starting condition to provide said predetermined interval.

OLIN L. MacSORLEY.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,403,918 | Grosdoff | July 16, 1946 |
| 2,422,698 | Miller | June 24, 1947 |

OTHER REFERENCES

Electronics, February 1948, "Predetermined Counter for Process Control," by Blume, pages 88–93.